United States Patent
Cai et al.

(10) Patent No.: US 11,741,665 B2
(45) Date of Patent: Aug. 29, 2023

(54) IMAGE PROCESSING APPARATUS AND NON-TRANSITORY COMPUTER READABLE MEDIUM STORING IMAGE PROCESSING PROGRAM

(71) Applicant: FUJIFILM BUSINESS INNOVATION CORP., Tokyo (JP)

(72) Inventors: Yuanyuan Cai, Kanagawa (JP); Makoto Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 487 days.

(21) Appl. No.: 16/832,049

(22) Filed: Mar. 27, 2020

(65) Prior Publication Data

US 2021/0090324 A1 Mar. 25, 2021

(30) Foreign Application Priority Data

Sep. 19, 2019 (JP) ................................. 2019-170585

(51) Int. Cl.
*G06T 15/30* (2011.01)
*G06T 7/194* (2017.01)
*G06T 7/187* (2017.01)

(52) U.S. Cl.
CPC .............. *G06T 15/30* (2013.01); *G06T 7/187* (2017.01); *G06T 7/194* (2017.01); *G06T 2210/12* (2013.01)

(58) Field of Classification Search
CPC ......... G06T 15/30; G06T 7/187; G06T 7/194; G06T 2210/12; G06T 2207/20156; G06T 7/12

See application file for complete search history.

(56) References Cited

U.S. PATENT DOCUMENTS

| | | | |
|---|---|---|---|
| 9,025,872 B2 | 5/2015 | Yabu | |
| 9,626,084 B2 * | 4/2017 | Waggoner | G06F 3/04883 |
| 10,769,718 B1 * | 9/2020 | Nunn | G06T 17/00 |
| 10,964,023 B1 * | 3/2021 | Vij | G06T 7/174 |
| 11,120,070 B2 * | 9/2021 | Huang | G06F 16/532 |
| 2002/0076106 A1 * | 6/2002 | Kondo | G06T 7/194 |
| | | | 382/194 |
| 2003/0214536 A1 * | 11/2003 | Jarrett | G06V 30/1423 |
| | | | 715/831 |
| 2009/0279755 A1 * | 11/2009 | Gindele | G06T 7/11 |
| | | | 382/128 |

(Continued)

FOREIGN PATENT DOCUMENTS

| | | |
|---|---|---|
| JP | 2006-33224 A | 2/2006 |
| JP | 2011-53759 A | 3/2011 |

(Continued)

OTHER PUBLICATIONS

May 30, 2023 Office Action issued in Japanese Patent Application No. 2019-170585.

*Primary Examiner* — William A Beutel
(74) *Attorney, Agent, or Firm* — Oliff PLC

(57) ABSTRACT

An image processing apparatus includes a processor configured to display boundaries each of which encloses a respective one of multiple candidate regions that correspond to foreground objects in an image, detect a single selecting operation, and extract a target region corresponding to one of the foreground objects from one or more candidate regions of the multiple candidate regions. The one or more candidate regions are selected by the single selecting operation.

9 Claims, 8 Drawing Sheets

(56) References Cited

U.S. PATENT DOCUMENTS

| | | | |
|---|---|---|---|
| 2013/0022255 A1* | 1/2013 | Chen | G06T 7/12 |
| | | | 382/173 |
| 2015/0213624 A1* | 7/2015 | Lee | G06T 7/194 |
| | | | 382/103 |
| 2015/0293592 A1* | 10/2015 | Cheong | G06F 1/163 |
| | | | 345/173 |
| 2016/0063721 A1* | 3/2016 | Nakano | G06T 7/11 |
| | | | 382/173 |
| 2017/0200279 A1* | 7/2017 | Zhong | G06T 7/194 |
| 2019/0171912 A1* | 6/2019 | Vallespi-Gonzalez | |
| | | | G06V 10/28 |
| 2020/0258306 A1* | 8/2020 | Forutanpour | G06T 11/60 |
| 2020/0394453 A1* | 12/2020 | Ma | G06N 20/00 |
| 2021/0027448 A1* | 1/2021 | Cohen | G06F 40/205 |
| 2022/0261601 A1* | 8/2022 | Amato | G06N 20/00 |

FOREIGN PATENT DOCUMENTS

| | | |
|---|---|---|
| JP | 2011-77790 A | 4/2011 |
| JP | 5107453 B1 | 12/2012 |
| JP | 2013-77296 A | 4/2013 |
| JP | WO2013-031096 A1 | 3/2015 |
| JP | 2015-201038 A | 11/2015 |
| JP | 2016-15043 A | 1/2016 |
| JP | 2017-204276 A | 11/2017 |
| JP | 2018-92610 A | 6/2018 |

\* cited by examiner

IMAGE PROCESSING APPARATUS AND NON-TRANSITORY COMPUTER READABLE MEDIUM STORING IMAGE PROCESSING PROGRAM

CROSS-REFERENCE TO RELATED APPLICATIONS

This application is based on and claims priority under 35 USC 119 from Japanese Patent Application No. 2019-170585 filed Sep. 19, 2019.

BACKGROUND

(i) Technical Field

The present disclosure relates to an image processing apparatus and a non-transitory computer readable medium storing an image processing program.

(ii) Related Art

Japanese Unexamined Patent Application Publication No. 2017-204276 proposes a method of detecting and counting microbes such as bacteria by using image processing. In this method, candidates for target objects are identified in a foreground image obtained by removing the background image from an input image, and candidate objects are screened based on the degree of similarity between the region surrounding a candidate object and the input image subjected to removal of the candidate object and the region surrounding the candidate object or the degree of similarity between the region surrounding a candidate object and the candidate object.

Re-publication of PCT International Publication No. WO2013/031096 describes image processing, such as clipping a major object out of an image or trimming an image. To perform such image processing, an image is divided into segments that are classified as an object segment, such as a person, or a foreground segment, and the degree of importance of a foreground segment is calculated based on the composition of the image and the relationship between the foreground segment in the image and the foreground segment in an image other than the image.

SUMMARY

In known methods of clipping a region of an object out of an image, if a plurality of target regions to be clipped are present, an operation of selecting a target region needs to be repeated a plurality of times. Aspects of non-limiting embodiments of the present disclosure relate to providing an image processing apparatus and a non-transitory computer readable medium storing an image processing program by which a plurality of target regions are clipped in a single operation out of an image having the plurality of target regions to be clipped.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including a processor configured to display boundaries each of which encloses a respective one of a plurality of candidate regions that correspond to foreground objects in an image, detect a single selecting operation, and extract a target region corresponding to one of the foreground objects from one or more candidate regions of the plurality of candidate regions. The one or more candidate regions are selected by the single selecting operation.

BRIEF DESCRIPTION OF THE DRAWINGS

An exemplary embodiment of the present disclosure will be described in detail based on the following figures, wherein.

DETAILED DESCRIPTION

Figure 1:
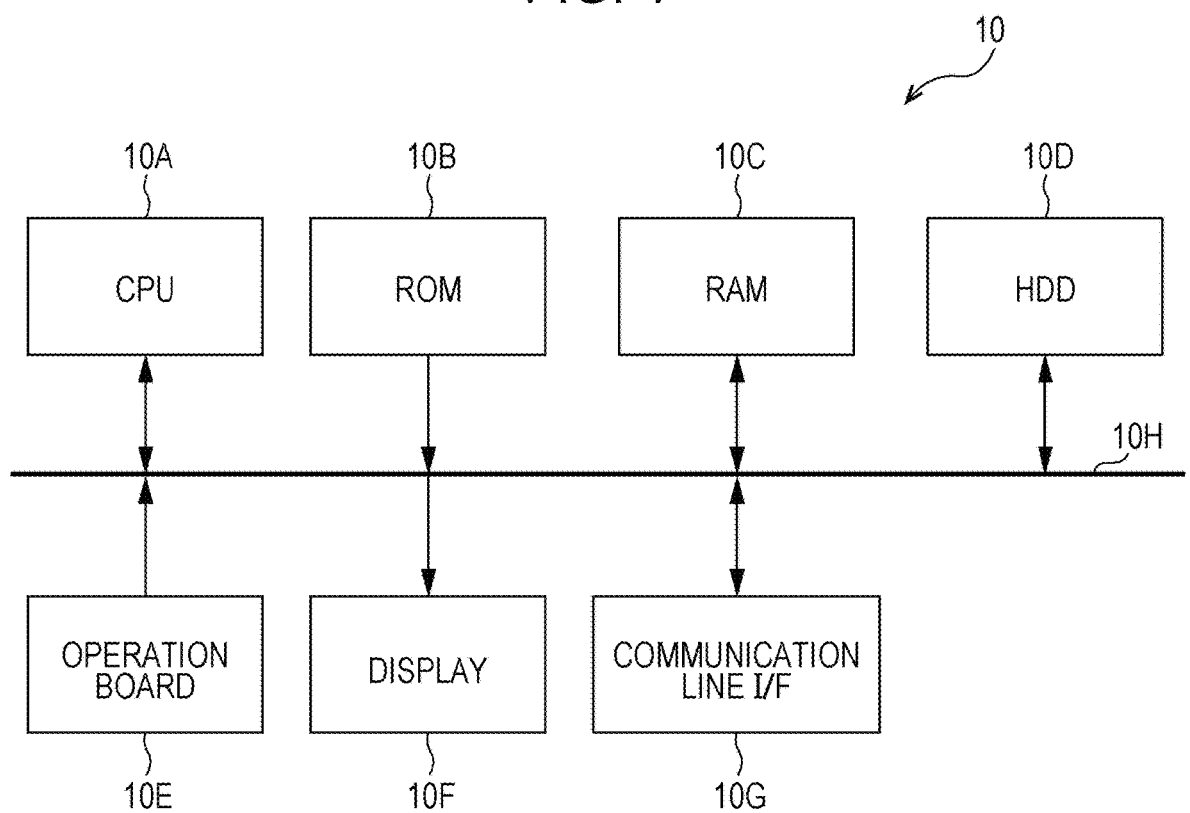
FIG. 1 is a block diagram illustrating a schematic configuration of an image processing apparatus according to the present exemplary embodiment.

Hereinafter, an example in the present exemplary embodiment will be described in detail with reference to the drawings. FIG. 1 is a block diagram illustrating a schematic configuration of an image processing apparatus according to the present exemplary embodiment.

An image processing apparatus 10 according to the present exemplary embodiment includes a central processing unit (CPU) 10A as an example of a processor, a read-only memory (ROM) 10B, a random-access memory (RAM) 10C, a hard disk drive (HDD) 10D, an operation board 10E, a display 10F, and a communication line interface (I/F) 10G. The CPU 10A manages the overall operation of the image processing apparatus 10. The ROM 10B stores various control programs, various parameters, and the like in advance. The RAM 10C is used as a work area and the like while the CPU 10A executes various programs. The HDD 10D stores various kinds of data, application programs, and the like. The operation board 10E includes various operation/input devices, such as a keyboard, a mouse, a touch panel, and a touch pen, and is used to receive various kinds of information. The display 10F, for which a display such as a liquid crystal is adopted, is used to display various kinds of information. The communication line I/F 10G is connected to a communication line such as a network and transmits and receives various kinds of data to and from other apparatuses connected to the communication line. All the above parts in the image processing apparatus 10 are electrically connected to each other via a system bus 10H. In the image processing apparatus 10 according to the present exemplary embodiment, although the HDD 10D is adopted as a storage memory, this is not meant to be limiting, and a different nonvolatile storage memory, such as a flash memory, may be adopted.

The above configuration of the image processing apparatus 10 according to the present exemplary embodiment enables the CPU 10A to access the ROM 10B, the RAM 10C, and the HDD 10D, acquire various kinds of data via the operation board 10E, and display various kinds of information on the display 10F. The image processing apparatus 10 also enables the CPU 10A to control transmission and reception of communication data via the communication line I/F 10G.

In the image processing apparatus 10 according to the present exemplary embodiment, the CPU 10A executes a program stored in advance in the ROM 10B or the HDD 10D and performs a process of detecting a detectable object in an image and clipping an object selected by a user. In the following description, a detectable object in an image is referred to as a foreground object, and a portion other than one or more foreground objects in an image is referred to as a background.

Figure 2:
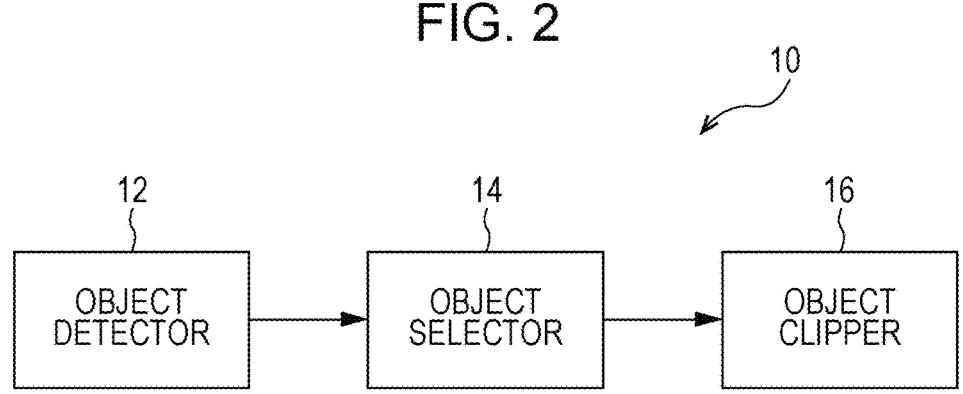
FIG. 2 is a functional block diagram of the image processing apparatus according to the present exemplary embodiment.

Next, a functional configuration of the image processing apparatus 10, which is configured as described above, according to the present exemplary embodiment will be described. FIG. 2 is a functional block diagram of the image processing apparatus 10 according to the present exemplary embodiment. Each function is realized by the CPU 10A, which executes a program stored in advance in the ROM 10B or the HDD 10D.

The image processing apparatus 10 has functions of an object detector 12, an object selector 14, and an object clipper 16.

Figure 3:
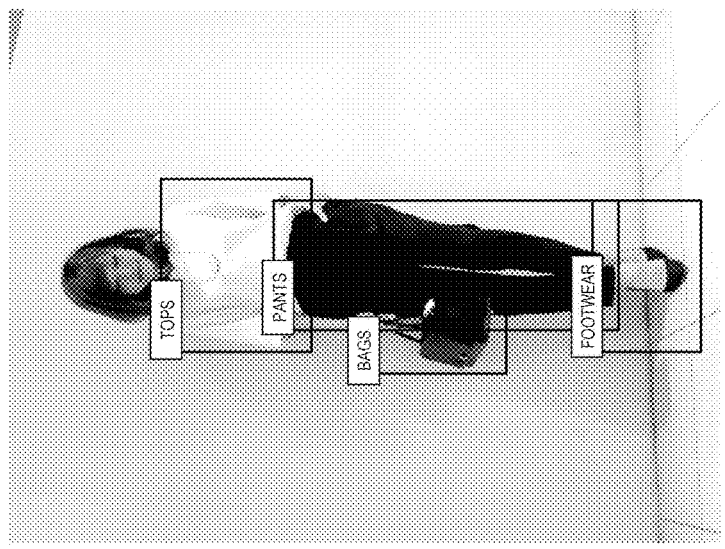
FIG. 3 illustrates an example of object detection of fashion items for a mail order service.
Figure 4:
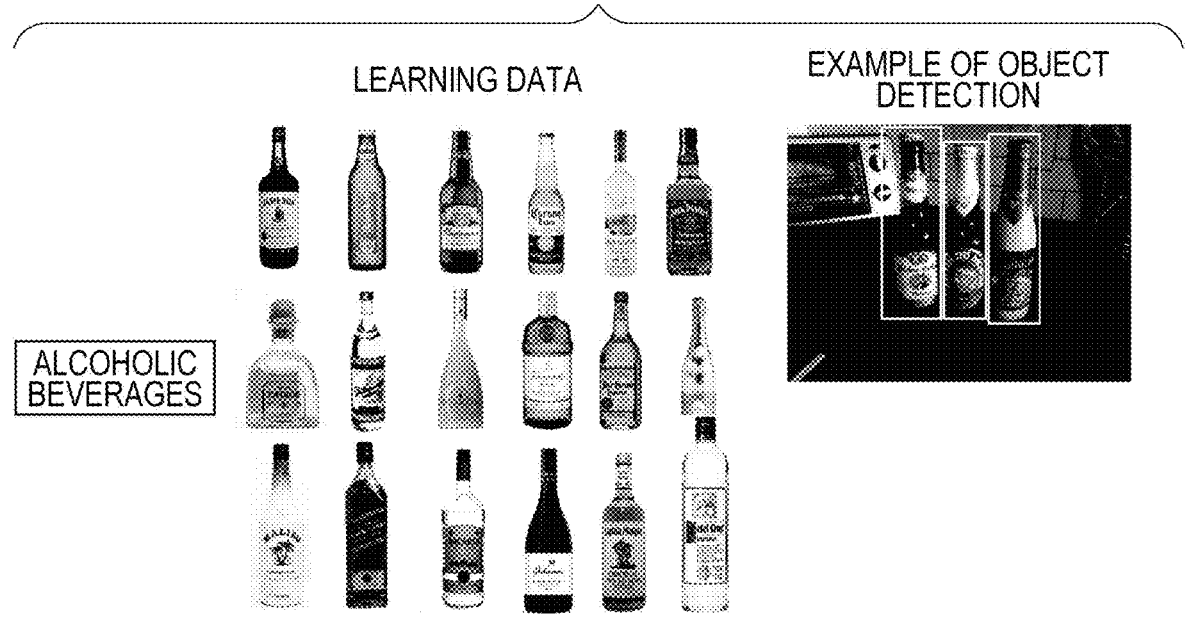
FIG. 4 illustrates an example of object detection of alcoholic beverages.

The object detector 12 performs a process of receiving image information including one or more objects to be detected, detecting one or more foreground objects in an image represented by the image information, and displaying on the display 10F a candidate region for each detected object by using a rectangular box. A foreground object is detected by using various techniques known in the art. For example, an algorithm for object detection, You Only Look Once (YOLO) v3, may be used for foreground object detection. FIGS. 3 and 4 illustrate examples of object detection. FIG. 3 illustrates an example of object detection of fashion items for a mail order service, and FIG. 4 illustrates an example of object detection of alcoholic beverages. FIG. 3 illustrates an example in which pieces of learning data corresponding to each of "tops", "skirts", "footwear", "bags", and "pants" are used to perform deep learning to detect objects and candidate regions for "tops", "footwear", "bags", and "pants" are indicated by using rectangular boxes. FIG. 4 illustrates an example in which pieces of learning data corresponding to images of various alcoholic beverages are used to perform deep learning to detect objects and candidate regions for three bottles of alcoholic beverage are indicated by using rectangular boxes.

Figure 5:
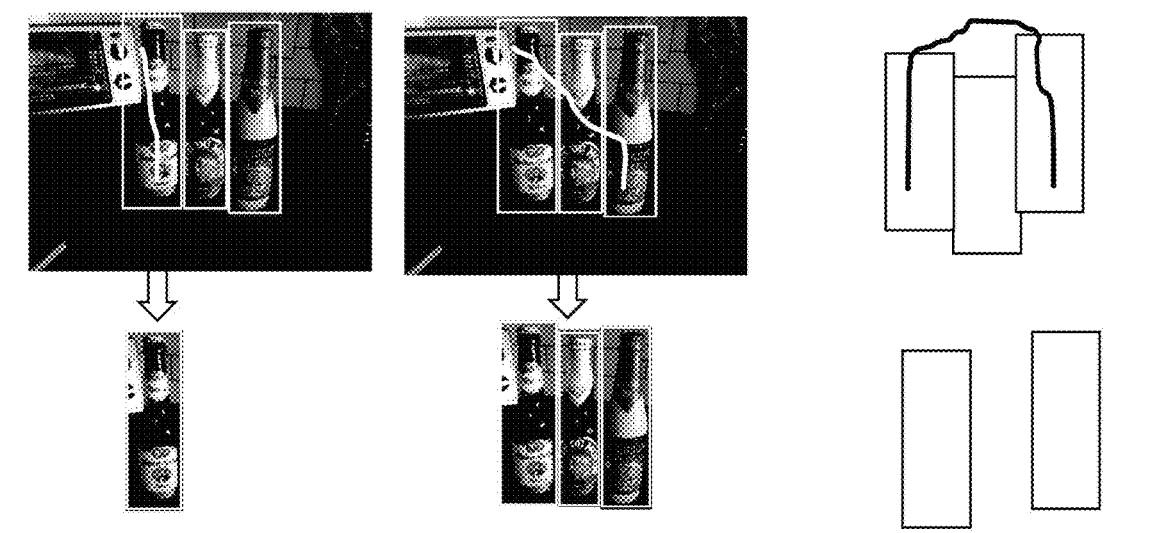
FIG. 5 illustrates examples of rectangular boxes selected by using traces produced by selecting operations.

The object selector 14 performs a process of selecting one or more rectangular boxes, each of which corresponds to a foreground object to be clipped, from rectangular boxes corresponding to candidate regions for detected objects. The selection is performed based on a single selecting operation that a user performs by operating the operation board 10E. In the present exemplary embodiment, one or more rectangular boxes, each of which corresponds to a foreground object to be clipped, are selected based on detection of a selecting operation that selects one or more displayed rectangular boxes corresponding to objects detected by the object detector 12. Specifically, as illustrated in FIG. 5, one or more rectangular boxes specified by a single operation, such as line drawing with a single stroke, performed by using the operation board 10E are selected. Each of the one or more rectangular boxes corresponds to a candidate region for an object. In the present exemplary embodiment, the object selector 14 selects one or more rectangular boxes overlapping a trace produced by the selecting operation performed by using the operation board 10E. FIG. 5 illustrates three kinds of examples in which rectangular boxes are selected, namely, an example in which one rectangular box corresponding to one bottle of alcoholic beverage is selected, an example in which three rectangular boxes corresponding to three bottles of alcoholic beverage are selected, and an example in which two rectangular boxes corresponding to two bottles are selected.

The object clipper 16 performs a process of clipping a foreground object out of a rectangular box selected by the object selector 14. Specifically, a method of region growing is applied, and a foreground object is clipped out of a rectangular box. In a method of region growing, a spatially contiguous region in which each pixel satisfies a predetermined condition concerning a pixel value is recognized as a single block. First, a pixel satisfying the predetermined condition concerning a pixel value is set as a seed point, and the same label is attached to a pixel that is located at a point near the seed point and that satisfies the predetermined condition. Iterating this process enables a single block to be recognized. A seed point is set manually in a method of region growing known in the related art. In the present exemplary embodiment, a seed point is set by using a trace and one or more rectangular boxes. The trace is produced by a selecting operation when the object selector 14 selects the one or more rectangular boxes. Three methods described below may be used to set seed points.

Figure 6:
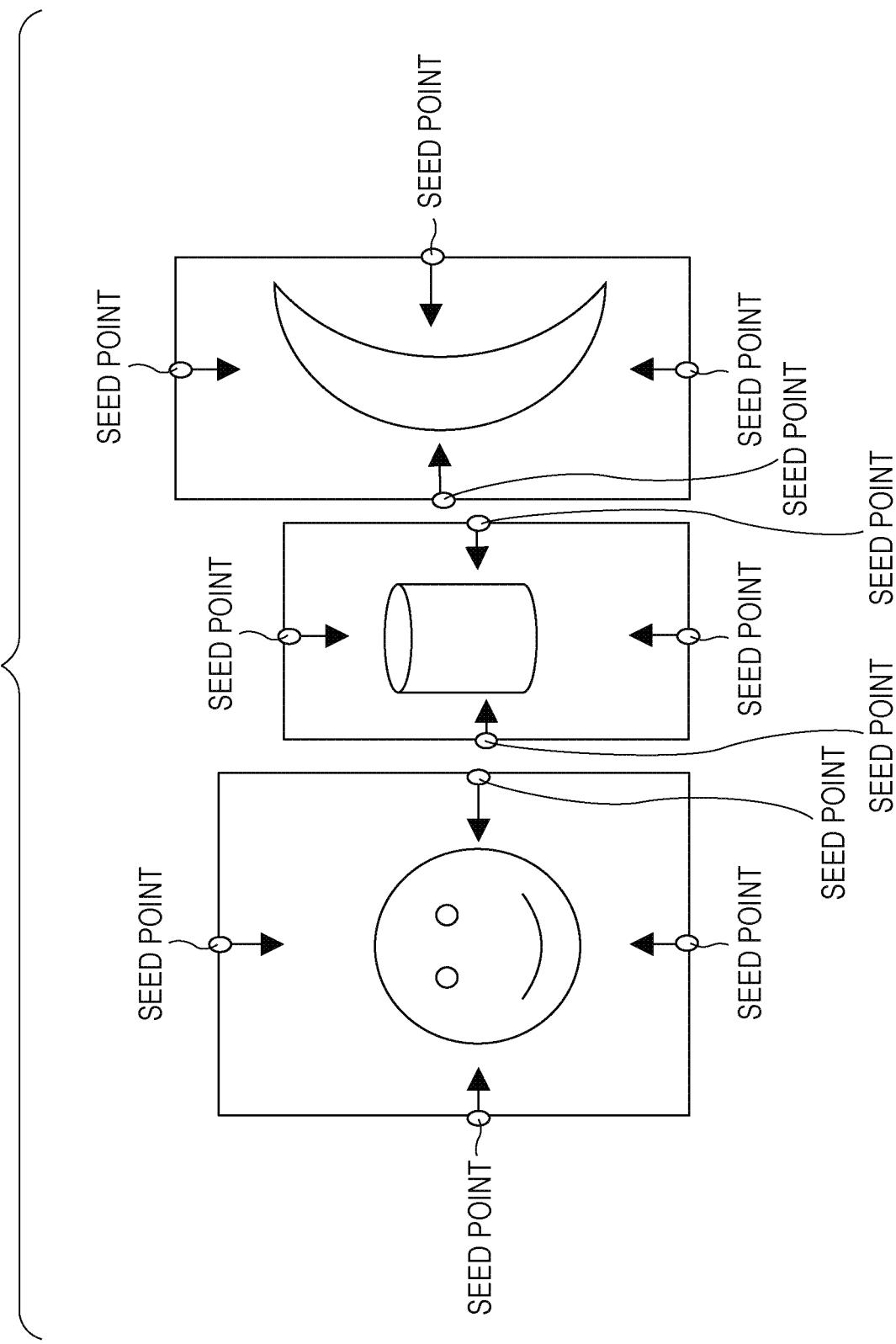
FIG. 6 illustrates an example of seed points each of which is set at the mid-point of a side of a rectangular box.

In a first method of setting seed points, seed points are specified for one or more rectangular boxes selected by the object selector 14. As illustrated in FIG. 6, a seed point is set at the mid-point of each side of a rectangular box. FIG. 6 illustrates an example of seed points each of which is set at the mid-point of a side of a rectangular box. Each box is independently segmented, and the same label is attached to a pixel located at a point near a seed point if the pixel has a red-green-blue (RGB) value similar to the RGB value of the seed point. The process is iterated toward the center of the box starting from each seed point, and pixels having the same label as the seed point are removed. Then, the remaining portion in the box is designated as an object to be clipped.

Figure 7:
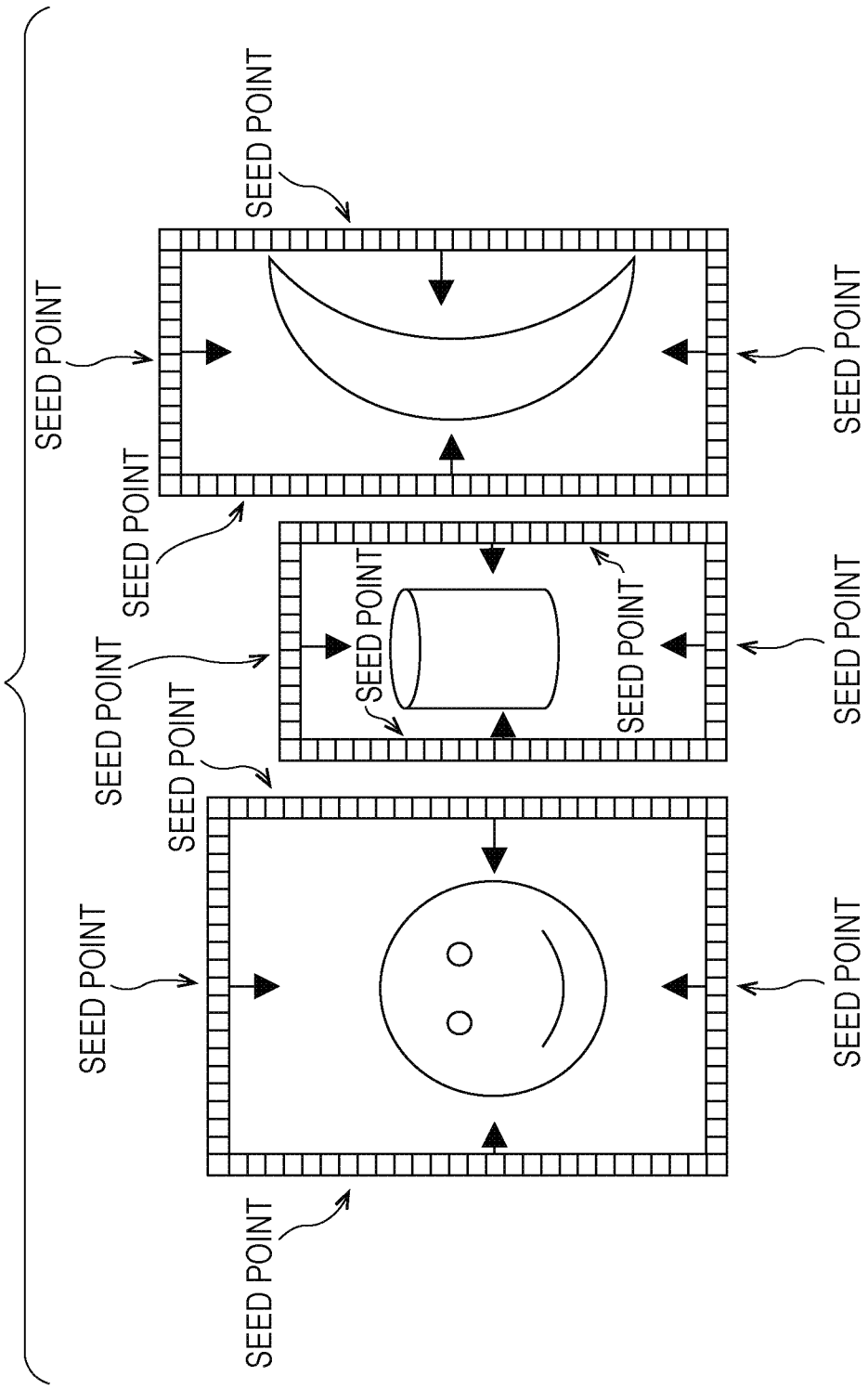
FIG. 7 illustrates an example of seed points set at all pixels forming each side of a rectangular box.

In a second method of setting seed points, seed points are specified for one or more rectangular boxes selected by the object selector 14. As illustrated in FIG. 7, seed points are set at all pixels forming four sides of each box. Alternatively, seed points may be set at some of the pixels forming each of the four sides of each box. FIG. 7 illustrates an example of seed points set at all pixels forming each side of a rectangular box. Each box is independently segmented, and the same label is attached to a pixel located at a point near a seed point if the pixel has an RGB value similar to the RGB value of the seed point. The process is iterated toward the center of the box starting from each seed point, and pixels having the same label as the seed point are removed. Then, the remaining portion in the box is designated as an object to be clipped.

Figure 8:
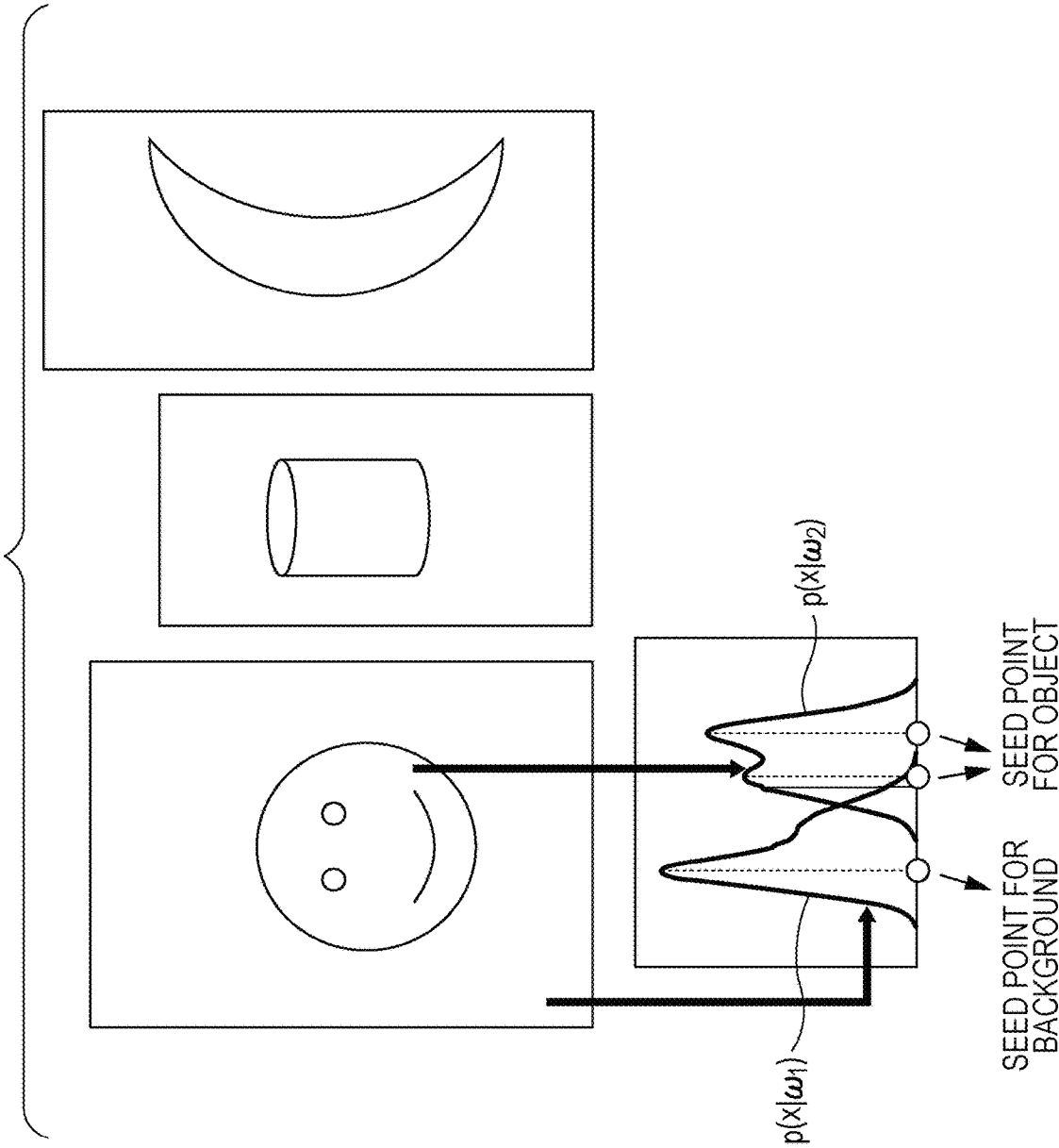
FIG. 8 illustrates an example in which color distributions of each region are obtained by using a Gaussian mixture model and a seed point is set at a pixel having the average color of the background color distribution.

In a third method of setting seed points, seed points are specified for one or more rectangular regions selected by the object selector 14. As illustrated in FIG. 8, color distributions of each region are obtained by using a Gaussian mixture model. Then, a color distribution histogram including a large number of pixels forming four sides is designated as the background color distribution, and another color distribution is designated as an object color distribution. A seed point is set at a pixel having the average color of the background color distribution. FIG. 8 illustrates an example in which color distributions of each region are obtained by using a Gaussian mixture model and a seed point is set at a pixel having the average color of the background color distribution. Each box is independently segmented, and the same label is attached to a pixel located at a point near a seed point if the pixel has an RGB value similar to the RGB value of the seed point. The process is iterated toward the center of the box starting from each seed point, and pixels having the same label as the seed point are removed. Then, the remaining portion in the box is designated as an object to be clipped.

Figure 9:
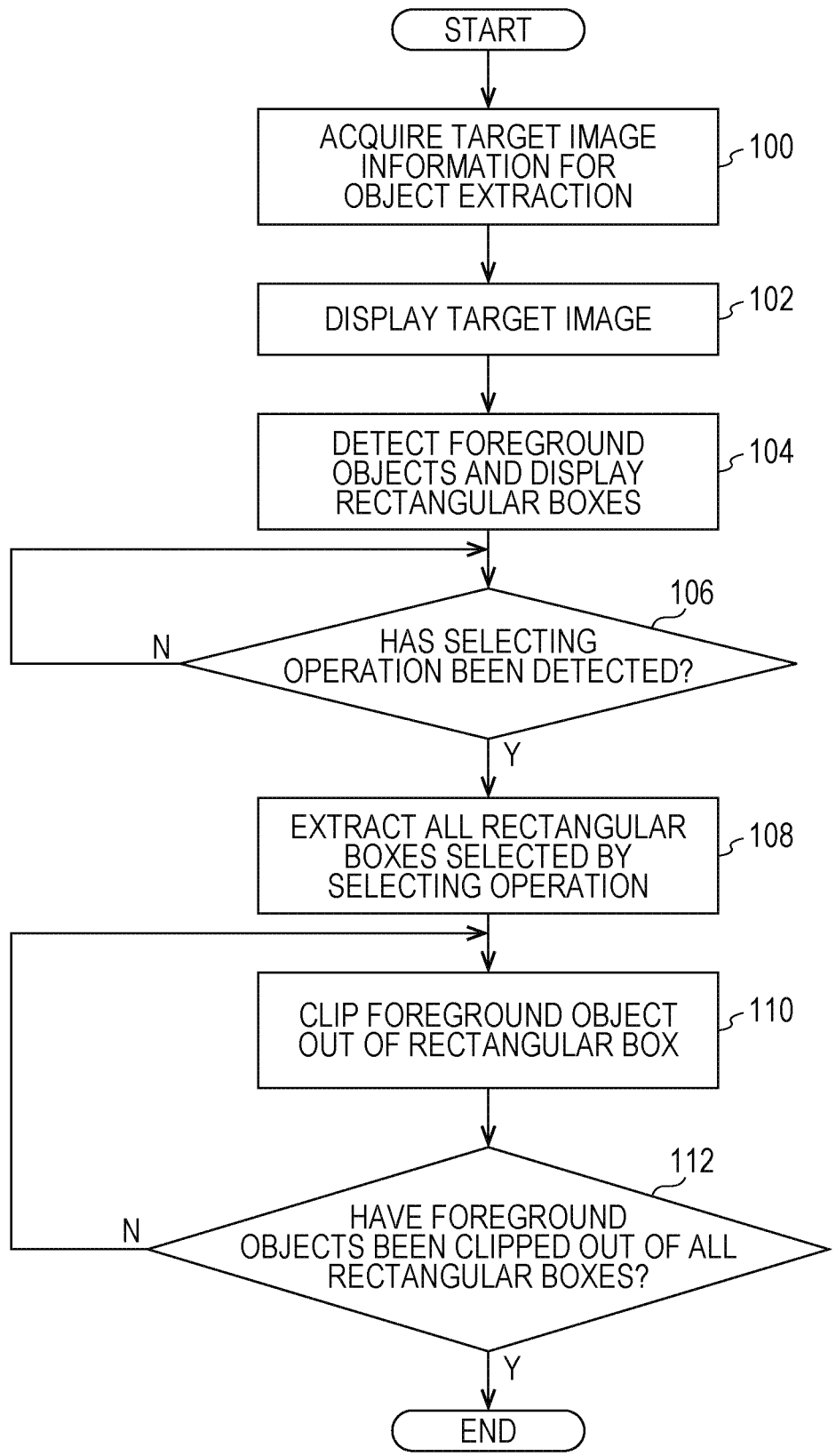
FIG. 9 is a flowchart illustrating an example of a flow of a specific process performed by the image processing apparatus according to the present exemplary embodiment.

Next, a process performed by the image processing apparatus 10, which is configured as described above, according to the present exemplary embodiment will be described. FIG. 9 is a flowchart illustrating an example of a flow of a specific process performed by the image processing apparatus 10 according to the present exemplary embodiment. The process illustrated in FIG. 9 starts, for example, in response to an instruction to start object detection, the instruction being received after target image information for object detection is selected.

In step 100, the object detector 12 acquires target image information for object detection, and the process proceeds to step 102. The target image information to be acquired may be a moving image or a static image.

Figure 10:
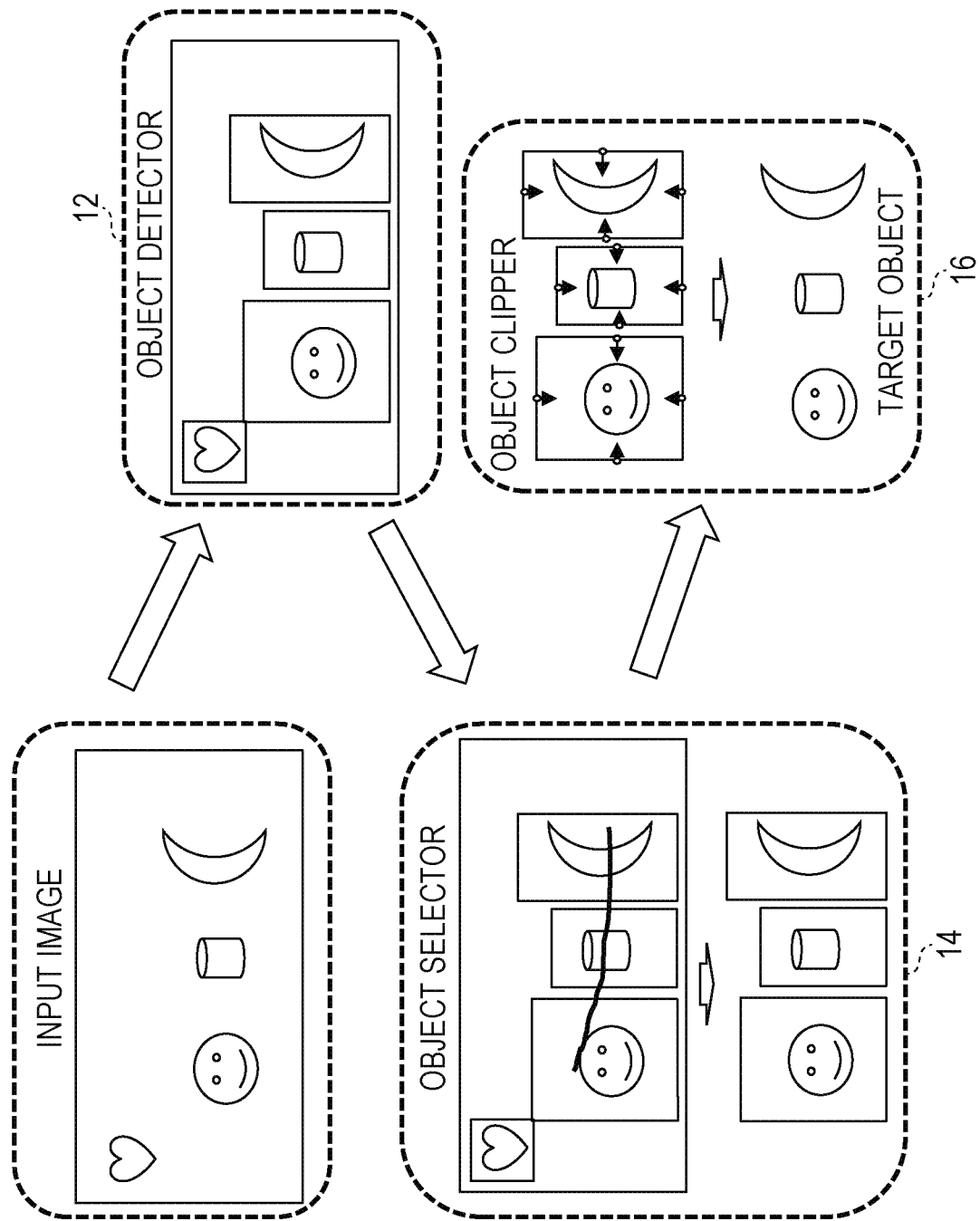
FIG. 10 illustrates an overall flow of a process performed by the image processing apparatus according to the present exemplary embodiment.

In step 102, the object detector 12 displays a target image on the display 10F in accordance with the acquired target image information, and the process proceeds to step 104. For example, such an input image as is illustrated in FIG. 10 is displayed on the display 10F.

In step 104, the object detector 12 detects one or more foreground objects in the image and displays one or more rectangular boxes enclosing candidate regions for the one or more foreground objects, and the process proceeds to step 106. In the present exemplary embodiment, the one or more foreground objects are detected in the image by using, for example, an algorithm for object detection, YOLO v3, and each of the candidate regions for the one or more foreground objects is displayed by using a rectangular box. In this way, as illustrated in FIG. 10, one or more rectangular boxes corresponding to the candidate regions for the one or more foreground objects detected by the object detector 12 are displayed on the display 10F.

In step 106, the object selector 14 determines whether a selecting operation by a user has been detected. For example, as illustrated in FIG. 10, it is determined whether a single selecting operation, such as line drawing with a single stroke, is performed by a user. The process waits until it is determined that the selecting operation has been detected before proceeding to step 108.

In step 108, the object selector 14 extracts all the rectangular boxes selected by the selecting operation, and the process proceeds to step 110. In the present exemplary embodiment, all the rectangular boxes overlapping a trace produced by the selecting operation are extracted. In this way, as illustrated in FIG. 10, one or more rectangular boxes extracted by the object selector 14 are displayed on the display 10F. In the present exemplary embodiment, a plurality of rectangular boxes are selected by a single selecting operation instead of repeating a selecting operation a plurality of times.

In step 110, the object clipper 16 clips a foreground object out of each of the one or more extracted rectangular boxes, and the process proceeds to step 112. In the present exemplary embodiment, a foreground object is clipped out of a rectangular box by using, for example, a method of region growing. Specifically, as illustrated in FIG. 10, seed points are set, and the same label is attached to pixels located at points near the seed points that are set if the pixels satisfy a predetermined condition concerning a pixel value. Then, iteration of this process enables pixels having the same label to be recognized as a single block, and a foreground object is clipped as a target object. FIG. 10 illustrates an example of a seed point set at the mid-point of each side of a rectangular box. In step 110, if a plurality of rectangular boxes are extracted, a foreground object is clipped out of a rectangular box of interest, and three foreground objects are clipped as target objects in the example illustrated in FIG. 10.

In step 112, it is determined whether the object clipper 16 has clipped foreground objects out of all the extracted rectangular boxes. If it is determined that one or more extracted rectangular boxes remains unclipped, the process returns to step 110, a rectangular box of interest is changed, and a foreground object is clipped out of the rectangular box of interest. This procedure is repeated until it is determined that all the extracted rectangular boxes have been clipped, and then the process completes a series of procedures.

In the exemplary embodiment above, the object detector 12 receives target image information for object detection, detects one or more foreground objects in an image, and displays on the display 10F candidate regions for detected objects by using rectangular boxes. Candidate regions for detected objects may be displayed by using a boundary other than a rectangular box. For example, a boundary having a shape other than a rectangle, such as a circle, an ellipse, or a polygon, may be used for displaying candidate regions.

Further, although an example in which the object clipper 16 uses a method of region growing to clip a foreground object is described in the exemplary embodiment above, a different method may be used to clip an object. For example, a clipping technique known in the art, such as graph cut segmentation, grab cut segmentation, or a Gaussian mixture model, may be used.

In addition, although three kinds of methods by which seed points are set for the background to enable the object clipper 16 to clip a foreground object are described as examples in the exemplary embodiment above, this is not meant to be limiting. For example, if a plurality of rectangular boxes do not overlap, seed points may be set at points at which a trace produced by a selecting operation to select rectangular boxes intersects the sides of the rectangular boxes. Alternatively, seed points may be specified for a foreground object instead of the background to enable the object clipper 16 to clip the foreground object. For example, a seed point may be set at the center of a rectangular box as a point corresponding to a foreground object to enable the object clipper 16 to clip the foreground object. Further, a plurality of kinds of methods of setting seed points may be provided, and a user may be allowed to choose one of the methods of setting seed points by operating the operation board 10E.

In the exemplary embodiment above, when the object detector 12 extracts a plurality of regions corresponding to foreground objects from an image as candidate regions and displays rectangular boxes, the object detector 12 may reduce the size of the image and extract candidate regions to obtain rectangular boxes. The object detector 12 may thereafter restore the obtained rectangular boxes to the original sizes and display the rectangular boxes. In this way, a processing load to extract candidate regions is reduced.

In the exemplary embodiment above, when the object clipper 16 clips a foreground object, the object clipper 16 may reduce the image size of a rectangular box selected by the object selector 14. The object clipper 16 may thereafter clip the foreground object and restore the foreground object to the original size.

In the embodiment above, although the CPU 10A is described as an example of a processor, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The process performed by the image processing apparatus 10 according to the exemplary embodiment above may be a process performed by using software, a process performed by using hardware, or a process performed by using a combination of software and hardware. The process performed by the image processing apparatus 10 may be stored in a recording medium as a program and distributed by using the recording medium.

The present disclosure is not limited to the exemplary embodiment above, and various modifications other than the exemplary embodiment above may obviously be practiced as long as they do not depart from the spirit of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor configured to:
display boundaries, each of which encloses a respective one of a plurality of candidate regions that correspond to foreground objects in an image, and each of the boundaries forming an enclosed boundary that corresponds to an object in the image;
detect a single selecting operation that is made on a side of at least one enclosed boundary, the selecting operation being a trace that overlaps the at least one enclosed boundary;
extract a target region corresponding to one of the foreground objects from one or more candidate regions of the plurality of candidate regions, the one or more candidate regions being selected by the single selecting operation and being enclosed by at least one enclosed boundary overlapping the trace;
set one or more seed points for a method of region growing at one or more points determined by using the trace and the boundaries;
clip an image corresponding to a foreground object out of the target region;
set the one or more seed points at one or more points corresponding to a background by using the trace and the boundaries;
clip an image corresponding to a foreground object out of the target region by excluding the background from the target region;
display rectangular boxes as the boundaries;
extract the one or more candidate regions enclosed by one or more of the rectangular boxes overlapping the trace; and
set the one or more seed points at one or more points included in each side of the rectangular boxes of the one or more candidate regions that are extracted.

2. The image processing apparatus according to claim 1, wherein the processor is configured to:
set one of the one or more seed points at a mid-point of each side of the rectangular boxes.

3. The image processing apparatus according to claim 1, wherein the processor is configured to:
set the one or more seed points at one or more pixels corresponding to each side of the rectangular boxes.

4. The image processing apparatus according to claim 1, wherein the processor is configured to:
obtain color distributions of each of the rectangular boxes by using a Gaussian mixture model;
designate a color distribution histogram including pixels corresponding to four sides as a background color distribution; and
set the one or more seed points at one or more pixels having an average color of the background color distribution.

5. The image processing apparatus according to claim 1, wherein the processor is configured to:
set the one or more seed points at one or more points that correspond to a foreground object and that are determined by using the trace and the boundaries; and
clip an image corresponding to the foreground object out of the target region.

6. The image processing apparatus according to claim 5, wherein the processor is configured to:
extract the one or more candidate regions enclosed by one or more of the boundaries overlapping the trace; and
set one of the one or more seed points at each center of the boundaries of the one or more candidate regions that are extracted.

7. The image processing apparatus according to claim 1, wherein the processor is further configured to:
reduce a size of the image; and
after the size of the image is reduced, the processor is further configured to:

extract a plurality of regions corresponding to the foreground objects from the image as the plurality of candidate regions;

obtain the boundaries;

restore the obtained boundaries to original sizes; and execute display of the boundaries.

8. A non-transitory computer readable medium storing a program causing a computer to execute a process for image processing, the process comprising:

displaying boundaries, each of which encloses a respective one of a plurality of candidate regions that correspond to foreground objects in an image, and each of the boundaries forming an enclosed boundary that corresponds to an object in the image;

detecting a single selecting operation that is made on a side of at least one enclosed boundary, the selecting operation being a trace that overlaps the at least one enclosed boundary;

extracting a target region corresponding to one of the foreground objects from one or more candidate regions of the plurality of candidate regions, the one or more candidate regions being selected by the single selecting operation and being enclosed by at least one enclosed boundary overlapping the trace;

setting one or more seed points for a method of region growing at one or more points determined by using the trace and the boundaries;

clipping an image corresponding to a foreground object out of the target region;

setting the one or more seed points at one or more points corresponding to a background by using the trace and the boundaries;

clipping an image corresponding to a foreground object out of the target region by excluding the background from the target region;

displaying rectangular boxes as the boundaries;

extracting the one or more candidate regions enclosed by one or more of the rectangular boxes overlapping the trace; and setting the one or more seed points at one or more points included in each side of the rectangular boxes of the one or more candidate regions that are extracted.

9. An image processing apparatus comprising:

means for displaying boundaries, each of which encloses a respective one of a plurality of candidate regions that correspond to foreground objects in an image, and each of the boundaries forming an enclosed boundary that corresponds to an object in the image;

means for detecting a single selecting operation that is made on a side of at least one enclosed boundary, the selecting operation being a trace that overlaps the at least one enclosed boundary;

means for extracting a target region corresponding to one of the foreground objects from one or more candidate regions of the plurality of candidate regions, the one or more candidate regions being selected by the single selecting operation and being enclosed by at least one enclosed boundary overlapping the trace;

means for setting one or more seed points for a method of region growing at one or more points determined by using the trace and the boundaries;

means for clipping an image corresponding to a foreground object out of the target region;

means for setting the one or more seed points at one or more points corresponding to a background by using the trace and the boundaries;

means for clipping an image corresponding to a foreground object out of the target region by excluding the background from the target region;

means for displaying rectangular boxes as the boundaries;

means for extracting the one or more candidate regions enclosed by one or more of the rectangular boxes overlapping the trace; and means for setting the one or more seed points at one or more points included in each side of the rectangular boxes of the one or more candidate regions that are extracted.

* * * * *